(12) United States Patent
Bakir (10) Patent No.: US 12,164,862 B2
(45) Date of Patent: *Dec. 10, 2024

(54) CONTEXTUAL ANSWER GENERATION IN SPREADSHEETS

(71) Applicant: Google LLC, Mountain View, CA (US)

(72) Inventor: Gökhan Bakir, Zurich (CH)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/226,013

(22) Filed: Jul. 25, 2023

(65) Prior Publication Data

US 2024/0028822 A1 Jan. 25, 2024

Related U.S. Application Data

(63) Continuation of application No. 17/687,275, filed on Mar. 4, 2022, now Pat. No. 11,709,994.

(51) Int. Cl.
*G06F 40/18* (2020.01)
*G06F 16/9538* (2019.01)

(52) U.S. Cl.
CPC .......... *G06F 40/18* (2020.01); *G06F 16/9538* (2019.01)

(58) Field of Classification Search
None
See application file for complete search history.

(56) References Cited

U.S. PATENT DOCUMENTS

| | | |
|---|---|---|
| 7,350,187 B1 | 3/2008 | Tong et al. |
| 8,140,533 B1 | 3/2012 | Elmeleegy et al. |
| 8,600,916 B2 | 12/2013 | Chen et al. |
| 8,645,825 B1 | 2/2014 | Cornea et al. |
| 9,959,265 B1 * | 5/2018 | Vagell ...................... G06F 40/18 |
| 10,013,413 B2 | 7/2018 | Otero et al. |
| 10,901,604 B2 | 1/2021 | Zhu et al. |
| 10,977,436 B2 | 4/2021 | Otero et al. |
| 2011/0010324 A1 | 1/2011 | Bolivar et al. |

(Continued)

FOREIGN PATENT DOCUMENTS

| | | |
|---|---|---|
| WO | 2014143208 A1 | 9/2014 |
| WO | 2016022511 A1 | 2/2016 |

OTHER PUBLICATIONS

International Search Report and Written Opinion for International Application No. PCT/US23/14537, mailed Jun. 30, 2023, 10 Pages.

*Primary Examiner* — Howard Cortes
(74) *Attorney, Agent, or Firm* — Lowenstein Sandler LLP (57) ABSTRACT

A method includes receiving, via a user interface of a client device, a request to populate one or more cells of a plurality of cells of a document having a tabular structure, wherein the one or more cells correspond to a first attribute pertaining to a first column header and a first object pertaining to a first row header; analyzing the request and one or more additional cells corresponding to one or more additional attributes and one or more additional objects of the document to obtain contextual information for the request; generating a query based at least in part on the contextual information; initiating an execution of the query to obtain a response using one or more data sources; and causing the user interface to be modified to populate the response in the one or more cells corresponding to the first attribute and the first object.

20 Claims, 4 Drawing Sheets

(56) References Cited

U.S. PATENT DOCUMENTS

2014/0372857 A1   12/2014  Otero et al.
2017/0017647 A1*  1/2017  Musuluri ................ G06F 16/94
2017/0124054 A1   5/2017  Campbell et al.
2018/0375805 A1  12/2018  Sethi et al.
2019/0163339 A1   5/2019  Zhu et al.

* cited by examiner

FIG. 1

|  | 210A | 210B | 210C | 210D | 210E |
|---|---|---|---|---|---|
| 220-1 |  | Number of Seats | Horse Power | Mileage |  |
| 220-2 | BMW |  |  |  |  |
| 220-3 | Mercedes |  |  |  |  |
| 220-4 | Lexus |  |  |  |  |
| 220-5 |  |  |  |  |  |

CONTEXTUAL ANSWER GENERATION IN SPREADSHEETS

CROSS-REFERENCE TO RELATED APPLICATIONS

This application is a continuation of co-pending U.S. patent application Ser. No. 17/687,275, filed on Mar. 4, 2022, entitled "CONTEXTUAL ANSWER GENERATION IN SPREADSHEETS," which is herein incorporated by reference in its entirety.

TECHNICAL FIELD

Aspects and implementations of the present disclosure relate generally to electronic documents, and more particularly relate to contextual answer generation in documents having a tabular structure.

BACKGROUND

An electronic document ("document") can have a tabular structure including a set of cells. Such a document can be referred to as a "data table," or simply "table." Each cell corresponds to a region for inputting data in a particular form (e.g. numerical or text data), and the document can be used to organize, analyze and/or store the input data. Each cell can include a non-numerical data entry, a mathematical expression for assigning a value to the cell, or can remain empty. A mathematical expression can include a numerical value, a reference to a value of one or more cells within the spreadsheet, an arithmetic operator, a relational operator, a function, etc. Additionally, the document can support programming capability. For example, a cell can be derived from one or more other cells of the document. In some implementations, the document can be a spreadsheet. The cells within the spreadsheet can be arranged as an array including a number of rows and a number of columns, where a particular cell of the spreadsheet can be addressed or referenced with respect to its column location within the table and its row location within the table. In some examples, columns can be represented by letters (e.g., Column A, Column B, . . . ) and rows can be represented by numbers (e.g., Row 1, Row 2, . . . ). For example, a cell located in Column D and Row 5 can be referenced as cell D5.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In some implementations, a method and system are disclosed. In some implementations, a method includes receiving, via a user interface of a device associated with a user, a request to populate one or more cells of a plurality of cells of a document having a tabular structure, wherein the one or more cells correspond to a first attribute pertaining to a first column and a first object pertaining to a first row. The method can also include analyzing the request to obtain contextual information indicating the first attribute and the first object. It can further include generating a query based at least in part on the contextual information. The method can also include initiating an execution of the query to obtain a response using one or more data sources. The user interface can be caused to be modified to populate the one or more responses in the one or more cells corresponding to the first attribute and the first object. The method can also include determining second contextual information based on the response, the second contextual information indicating a second attribute and a second object. The method can include generating a second query based at least in part on the second contextual information. It can further include initiating an execution of the second query to obtain a second response using one or more data sources. The method can also include causing the user interface to be modified to populate the second response in one or more cells corresponding to the second attribute and the second object.

In some implementations, a system includes a memory device and a processing device coupled to the memory device. The processing device can be configured to receive, via a user interface of a device associated with a user, a request to populate one or more cells of a plurality of cells of a document having a tabular structure, wherein the one or more cells correspond to a first attribute pertaining to a first column and a first object pertaining to a first row. The processing device can also be configured to analyze the request to obtain contextual information indicating the first attribute and the first object. The processing device can be configured to generate a query based at least in part on the contextual information. The processing device can also be configured to initiate an execution of the query to obtain a response using one or more data sources. The processing device can be configured to cause the user interface to be modified to populate the one or more responses in the one or more cells corresponding to the first attribute and the first object. The processing device can further be configured to determine second contextual information based on the response, the second contextual information indicating a second attribute and a second object. The processing device can be configured to generate a second query based at least in part on the second contextual information. The processing device can be configured to initiate an execution of the second query to obtain a second response using one or more data sources. The processing device can also be configured to cause the user interface to be modified to populate the second response in one or more cells corresponding to the second attribute and the second object.

In some implementations, a non-transitory computer readable storage medium includes instructions that, when executed by a processing device, cause the processing device to receive, via a user interface of a device associated with a user, a request to populate one or more cells of a plurality of cells of a document having a tabular structure, wherein the one or more cells correspond to a first attribute pertaining to a first column and a first object pertaining to a first row. The instructions can also cause the processing device to analyze the request to obtain contextual information indicating the first attribute and the first object. The instructions can also cause the processing device to generate a query based at least in part on the contextual information. The instructions can further cause the processing device to initiate an execution of the query to obtain a response using one or more data sources. The instructions can also cause the processing device to cause the user interface to be modified to populate the one or more responses in the one or more cells corresponding to the first attribute and the first object.

The instructions can also cause the processing device to determine second contextual information based on the response, the second contextual information indicating a second attribute and a second object. The instructions can also cause the processing device to generate a second query based at least in part on the second contextual information. The instructions can further cause the processing device to initiate an execution of the second query to obtain a second response using one or more data sources. The instructions can also cause the processing device to cause the user interface to be modified to populate the second response in one or more cells corresponding to the second attribute and the second object.

The foregoing summary of the present invention with the preferred embodiments should not be construed to limit the scope of the invention. It should be understood and obvious to one skilled in the art that the embodiments of the invention thus described may be further modified without departing from the spirit and scope of the invention.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Aspects of the present disclosure relate to contextual answer generation in documents having a tabular structure. One challenge in constructing an electronic document ("document") having a tabular structure (e.g., spreadsheet) is populating data into the document. As an illustration, the following portion of a spreadsheet including Columns A-E and Rows 1-3 is provided as Table 1:

TABLE 1

|   | A | B | C | D | E |
|---|---|---|---|---|---|
| 1 | Objects | Price | Square Meter | Distance to Work | Neighborhood |
| 2 | House 1 | | | | |
| 3 | House 2 | | | | |

Table 1 is a portion of a spreadsheet that organizes data related to a set of houses. The set of houses includes House 1 and House 2. There are also attributes corresponding to the set of houses. More specifically, the cells in Column A define the column header ("Object") and the name/number of each house. The cells in Column B define the column header ("Price") and the price of each house defined by a cell of Column A within the same row. The cells in Column C define the column header ("Square Meter") and the square meter for each house defined by a cell of Column A within the same row. The cells in Column D define the column header ("Distance to Work") and the distance to work for each house defined by a cell of Column A within the same row. The cells in Column E define the column header ("Neighborhood") and the neighborhood of each house defined by a cell of Column A within the same row.

Conventionally, each of the blank cells of the spreadsheet corresponding to a row and column can be manually entered into the spreadsheet, e.g., by a user via a computing device. Although conventional spreadsheets enable the use of mathematical expressions to derive cell values with reference to other cell values, oftentimes conventional spreadsheets typically require users to manually enter a large amount of data. Further, some conventional spreadsheets can be used as decision matrices. In a decision matrix, each column header of a spreadsheet can be a set of attributes for a decision, while each row header of the spreadsheet can be a set of alternatives (hereinafter referred to as "objects") for the decision. For example, Table 1 herein above can be a decision matrix to decide key aspects of buying a house. However, the decision matrix needs to be populated, which can often take significant time since the input for each cell is not easily known. For example, users will typically need to consult other data sources, such as web search engines, websites, or other external data sources in order to populate each cell of a decision matrix. For example, in Table 1, in order to populate cell B2 (the price of House 1), a user can manually search using a data source (e.g., a web search engine) for the price of the house and then manually enter the price into cell B2. In order to populate cell D3 (distance to work from House 2), a user can manually search for the answer using the web search engine or another data source (e.g., a web site that calculates distances between locations, etc.). The user can then manually enter the distance to work into cell D3. A user thus needs to manually populate each cell with data, which can result in incorrect values in some of the cells due to human errors and can take significant time and computing resources.

Aspects of the present disclosure address the above and other deficiencies by providing contextual answer generation in documents having a tabular structure (e.g., spreadsheets). In some implementations, a user can request that one or more cells of the spreadsheet be populated. The one or more cells can be one or more blank cells of the spreadsheet (e.g., cells B2, B3 in Table 1). In order to request the one or more blank cells to be populated, the user can select (e.g., highlight using their mouse cursor) the one or more blank cells to be populated. The user can also select other cells of the spreadsheet that are to be used as contextual information in populating the one or more blank cells. A contextual answer generation manager of a computing system can analyze the request in order to identify the contextual information. For example, the contextual answer generation manager can extract the column header and row header corresponding to each blank cell of the spreadsheet. For example, as illustrated in Table 1, a user can select cell B2 to be populated. The contextual answer generation manager can extract the corresponding column header ("Price") and the corresponding row header ("House 1") as the contextual information. The column header is the first cell within a column, and a row header is the first cell within a row. In some implementations, each column header represents an attribute, and each row header represents an object, as described herein above. The contextual answer generation manager can generate a query based at least partly on the contextual information (e.g., the attribute and object). The query can include a string representing the attribute and a string representing the object.

In some implementations, the contextual answer generation manager can execute the query using one or more data sources. For example, the contextual answer generation manager can execute the query using a web search engine, a website, and/or an external database. For example, the contextual answer generation manager can generate a query for cell B2, where the query includes the corresponding attribute and object (Price, House 1). The contextual answer generation manager can execute the query using a web search engine to obtain a response to the query. The contextual answer generation manager can populate the response into the blank cell (e.g., cell B2). Thus, instead of users having to manually search for/identify each response to populate cells of a spreadsheet, the contextual answer generation manager can generate a query based on the contextual information and then populate the response to the query into a cell. Therefore, significant time can be saved, and human error can be eliminated.

In some implementations, it can be beneficial for a user to see additional attributes and objects that are related to the already-existing attributes and objects in the spreadsheet. For example, in Table 1, a user might want to see a price of a third house. In another example, a user might want to see a safety score of House 1. However, this can increase the amount of time it takes to populate cells of the spreadsheet. Thus, in some implementations of the present disclosure, the contextual answer generation manager can automatically (e.g., without a user request or instruction) generate additional queries in order to retrieve responses to populate other cells of the spreadsheet, including column headers (attributes) and row headers (objects). This can reduce the time needed to determine additional attributes and/or objects to be used in the spreadsheet to populate more responses that can be important to a user for decision-making.

Thus, providing contextual answer generation in spreadsheets can eliminate human errors, which may result from manual entries, and reduce the time and computing resources needed to enable users to search for spreadsheet data and to populate it with data. In addition, the automatic contextual answer generation of additional attributes and/or objects of the spreadsheet can further improve computational efficiency and reduce utilization of computing resources.

Figure 1:
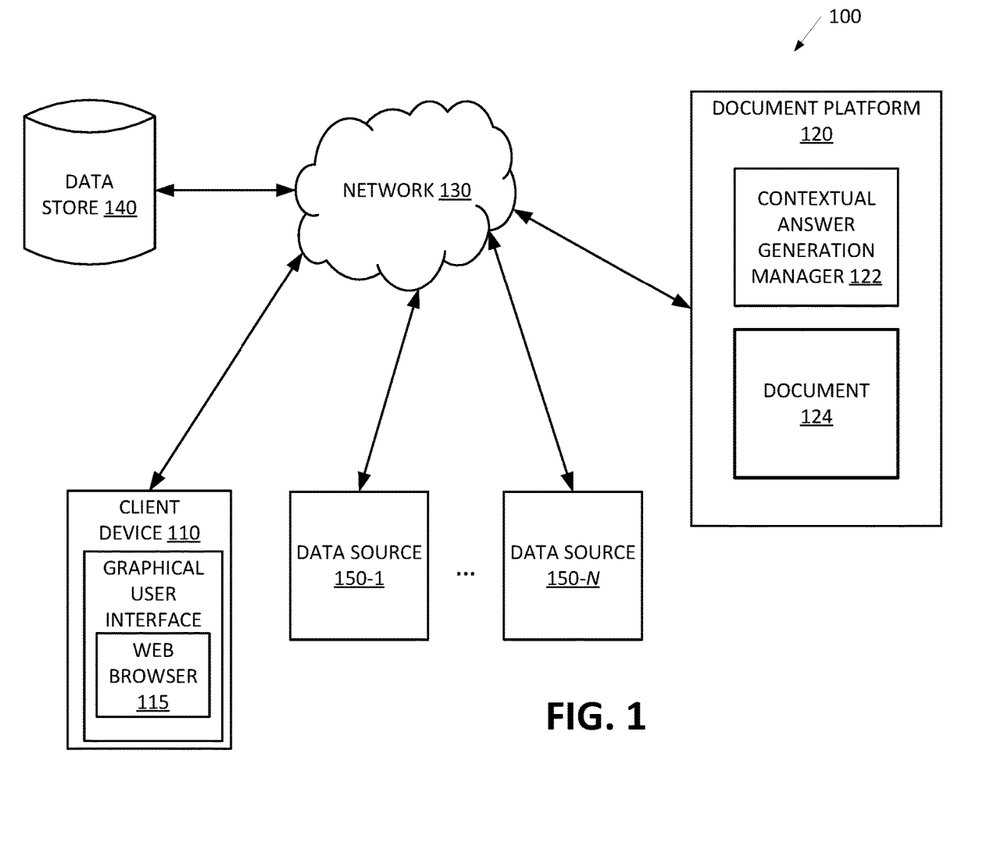
FIG. 1 illustrates an example system architecture, in accordance with implementations of the present disclosure.

FIG. 1 illustrates an example system architecture 100, in accordance with implementations of the present disclosure. The system architecture 100 (also referred to as "system" herein) includes at least one client device 110 that can connect to servers, such as document platform 120 (e.g., server), via a network 130. One client device 110 and one document platform 120 are illustrated as connected to network 130 for simplicity. In practice, there may be more client devices and/or document platforms. Also, in some instances, a client device may perform one or more functions of a document platform and a document platform may perform one or more functions of a client device. Client device 110 may access or receive information from document platform 120. The system architecture 100 can represent a cloud-based environment (e.g., a cloud-based storage platform), which can enable communication between server(s) hosting document platform 120 and client devices 110 over the network 130 to store and share electronic documents. Alternatively, the system architecture 100 can apply to systems that are locally interconnected. Further, although some aspects of the disclosure are described with reference to spreadsheets and document applications managing spreadsheets, it should be understood to those skilled in the art that the systems, methods, functions, and embodiments of the present disclosure can apply to any type of electronic documents (including, for example, slide presentations, text documents, etc.) and any type of programs or services offered by any type of host applications.

In implementations, network 130 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. Client device 110 can include a computing device such as personal computer (PC), laptop, mobile phone, smart phone, tablet computer, netbook computer, network-connected television, etc. The client device 110 can be associated with one or more users, and the client device 110 can also be referred to as a "device" or "user device."

In the implementation shown, document platform 120 may interact with client device 110 such that client device 110, in conjunction with document platform 120, can execute an electronic document ("document") application to manage various documents including documents having a tabular structure. For example, the document application can be an online document application. In some implementations, the document application is a spreadsheet application (e.g., online spreadsheet application). Alternatively, the document application can provide functionality described herein without the use of document platform 120. Yet alternatively, document platform 120 can interact with a web browser 115 (rather than a designated document application) to, for example, present documents, receive user input related to the documents, etc.

Documents of a user of the client device 110 may be stored by document platform 120 in, for example, data store 140. Although illustrated as a single device in FIG. 1, document platform 120 may be implemented as, for example, a single computing device or as multiple distributed computing devices. It should be understood and appreciated that whether a device is functioning as a server or a client device can depend on the specific application being implemented. That is, whether a computing device is operating as a client or a server may depend on the context of the role of the computing device within the application. The relationship of client device and server can arise by virtue of program executing on the respective devices and having a client-server relationship to each other.

As discussed above, the interaction of client device 110 with document platform 120 may be implemented through a web browser 115 executed at client device 110. The term "web browser" is intended to refer to any program that allows a user to browse markup documents (e.g., web documents), regardless of whether the browser program is a stand-alone program or an embedded program, such as a browser program included as part of an operating system. In some implementations, the document application, as described herein, is implemented as a distributed web application in which portions of the document application execute at one or more of client device 110 and at document platform 120. More specifically, client device(s) 110 may request the document application from document platform 120. In response, document platform 120 may transmit portions of the document application for local execution at clients 110. The document application may thus execute as a distributed application across document platform 120 and one or more client devices 110. In this manner, client device 110 may not be required to install any document application locally to use the document application hosted by the document platform 120.

In general, functions described in implementations as being performed by the document platform 120 can also be performed on the client device 110 in other implementations, if appropriate. In addition, the functionality attributed to a particular component can be performed by different or multiple components operating together. The document platform 120 can also be accessed as a service provided to other systems or devices through appropriate application programming interfaces.

In implementations of the disclosure, a "user" can be represented as a single individual. However, other implementations of the disclosure encompass a "user" being an entity controlled by a set of users and/or an automated source. For example, a set of individual users federated as a community in a social network can be considered a "user." In another example, an automated consumer can be an automated ingestion pipeline, such as a topic channel, of the document platform 120.

A document, as described herein, may be implemented as a distributed web application in which portions of the application execute at multiple client devices 110 and at the document platform 120 to provide for collaboration among multiple users working on a single document. For example, multiple users may simultaneously or concurrently edit such a collaborative document and view the edits of each of the users in real time or near real time (e.g., within a few milliseconds or seconds). When one user edits the document (e.g., a cell of the document), the edit may be transmitted to the document platform 120 and then forwarded to other collaborating users that are also editing or viewing the spreadsheet. To this end, the document platform 120 may handle conflicts between collaborating users, such as when two users try to simultaneously edit a particular cell. For example, the document platform 120 may accept the first edit received or in some way prioritize the collaborating users such that the edits of higher priority users override those of lower priority users. If an edit of a user is rejected by the document platform 120, the document platform 120 may transmit a message back to the user that informs that user of the rejection of the edit. In this manner, multiple users may collaborate, potentially in real-time (or near real-time), on a single spreadsheet. In some implementations, the parties that view and collaborate on a particular document may be specified by an initial creator of the document. For example, the initial creator of the document may be given "administrator" privileges that allow the creator to specify the privileges for each of the other possible collaborators. The initial creator may specify that the other collaborators have privileges to do one or more of the following: edit the spreadsheet, view the spreadsheet only, edit designated parts of the spreadsheet, or add additional users to the list of possible collaborators. For example, certain users may be able to edit certain parts of the spreadsheet, while other designated cells or regions of cells will remain "locked" to those users such that the users can view but not edit the locked cells. In some implementations, a document may be designated as a "public" document that anyone can view and/or edit.

As further shown, the document platform 120 may include a contextual answer generation manager 122 to provide contextual answer generation in documents (e.g., spreadsheets, text documents or slide presentations including tables, etc.). The contextual answer generation manager 122 can, in response to receiving a request to populate one or more cells of a spreadsheet (e.g., a document 124) for a user from the client device 110, analyze the request for contextual information and generate a query based on the contextual information to be executed in order to populate the one or more cells of the document 124. The query can be executed to obtain a response from one or more data sources 150-1 through 150-N.

In some implementations, contextual answer generation manager 122 of a computing system can analyze the request in order to identify the contextual information which indicates what type of data should be populated in one or more cells of the spreadsheet. For example, the contextual answer generation manager 122 can extract the column header and row header corresponding to each blank cell of the spreadsheet. The column header is the first cell within a column, and a row header is the first cell within a row. In some implementations, each column header represents an attribute, and each row header represents an object, as described herein above. The contextual answer generation manager 122 can generate a query based at least partly on the contextual information (e.g., the attribute and object). The query can include a string representing the attribute and a string representing the object. The contextual answer generation manager 122 can execute the query using one or more data sources. For example, the contextual answer generation manager 122 can execute the query using a web search engine, a website, and/or an external database to obtain a response to the query. The contextual answer generation manager 122 can populate the response into the blank cell. In some implementations, the contextual answer generation manager 122 can automatically (e.g., without user request) generate additional queries based on the previously-generated response(s) and/or any additional information related to the spreadsheet (e.g., one or more of the existing attributes, one or more of the existing objects, a title of the spreadsheet, other populated cells of the spreadsheet, etc.) in order to populate other blank cells of the spreadsheet, including column headers (attributes) and row headers (objects).

In some implementations, the document 124 can have a large amount of data (e.g., a large number of columns and/or rows in a spreadsheet). This can lead to increased consumption of resources, increased cost for acquiring data, etc. To address this, in some implementations, the contextual answer generation manager 122 can enable configurable size limits with respect to the size of the document 124. For example, the contextual answer generation manager 122 can adjust a size of the document 124 based on user input defining how many rows and/or columns the document 124 should include. As another example, the contextual answer generation manager 122 can detect that the document 124 will have a large volume of data (e.g., an amount of data exceeding a threshold amount of data), and notify a user of the large volume of data. The notification can include a request for the user to define how much data to include in the document 124. Additionally or alternatively, the maximum size of the document 124 can be a user-defined setting or threshold. Accordingly, the contextual answer generation manager 122 can implement functionality to improve computational resource efficiency.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 2:
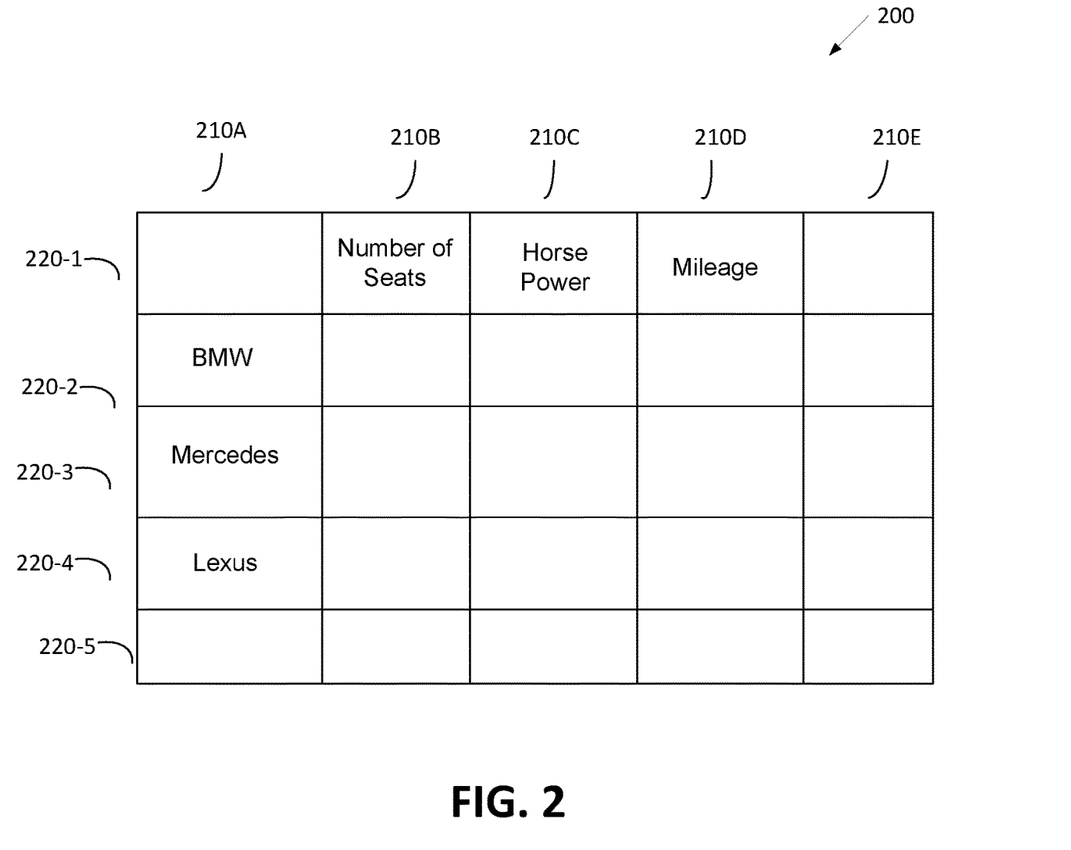
FIG. 2 depicts a diagram of an example spreadsheet including a set of cells, in accordance with implementations of the disclosure.

FIG. 2 is a diagram depicting an example spreadsheet 200 including a set of cells, in accordance with implementations of the present disclosure. Although an example spreadsheet is shown in FIG. 2, such an example should not be considered limiting, and any suitable personalized document having a tabular structure is contemplated.

As shown, the spreadsheet 200 includes a number of cells that are arranged in an intersecting number of columns 210A through 210E and a number of rows 220-1 through 220-5. Although 5 columns and 5 rows are shown, the number of columns and rows should not be considered limiting. At least some of the cells have values inputted in them. The spreadsheet 200 can be arranged such that values that are inputted in a particular row or column all have some manner of common meaning, such as falling in a common category of data or all being related to a certain thing or topic. The spreadsheet 200 can also be related to an overall thing or topic.

As shown, spreadsheet 200 can be a decision matrix for decision-making on buying a car. Each row 220-2 to 220-5 is designated for a different object (e.g., a type of car). Row 220-2 can be designated for the object "BMW." Row 220-3 can be designated for the object "Mercedes." Row 220-4 can be designated for the object "Lexus." Each column 210B to 210E is designated for a different attribute corresponding to the object. For example, column 210B can be designated for "Number of Seats." The text "Number of Seats" is entered into the cell having an address defined by row 220-1 and column 210B to indicate that the data maintained in the other cells of column 210B correspond to a number of seats (e.g., the respective cells having addresses defined by column 210B and rows 220-2 through 220-5). Accordingly, column 210B is defined as a "Number of Seats" type of information and includes cells having values indicative of respective numbers of seats of various cars (e.g., BMW, Mercedes, Lexus).

Column 210C can be designated for "Horse Power." The text "Horse Power" is entered into the cell having an address defined by row 220-1 and column 210C to indicate that the data maintained in the other cells of column 210C correspond to of horse power values (e.g., the respective cells having addresses defined by column 210C and rows 220-2 through 220-5). Accordingly, column 210C is defined as a "Horse Power" type of information and includes a number of cells having values indicative of respective horse powers of various cars (e.g., BMW, Mercedes, Lexus).

Column 210D can be designated for "Mileage." The text "Mileage" is entered into the cell having an address defined by row 220-1 and column 210D to indicate that the data maintained in the other cells of column 210D correspond to mileage values (e.g., the respective cells having addresses defined by column 210D and rows 220-2 through 220-5). Accordingly, column 210D is defined as a "Mileage" type of information and includes a number of cells having values indicative of respective horse powers of various cars (e.g., BMW, Mercedes, Lexus).

A request can be received by a contextual answer generation manager (e.g., the contextual answer generation manager 122 of FIG. 1) via a user interface (e.g., the graphical user interface 112 of FIG. 1) of a user device (e.g., the client device 110 of FIG. 1). The user interface may display the spreadsheet 200 and the request can identify one or more cells of the spreadsheet 200 to be populated. For example, a user can request that a blank cell of the spreadsheet 200 (e.g., the cell corresponding to column 210B and row 220-2) be populated (e.g., by highlighting or otherwise selecting or identifying the cell using a cursor and/or a cursor control device). The contextual answer generation manager can analyze the request for contextual information. For example, the contextual answer generation manager can extract a string representing the corresponding attribute and object for the requested cell. For example, as illustrated in FIG. 2, the contextual answer generation manager can identify the column header and row header corresponding to the blank cell at column 210B and row 220-2. The corresponding column header is column 210B ("Number of Seats"), and the corresponding row header is row 220-2 ("BMW"). The contextual answer generation manager can generate a query based on the contextual information. The query can include a string with the corresponding attribute ("Number of Seats") and the corresponding object ("BMW"). In some embodiments, specified header names are used for attribute and object strings (e.g., when these header names clearly identify the type of data they represent). Alternatively (e.g., if any of the header names are ambiguous and do not clearly identify the type of data they represent), semantic analysis can be performed based on existing content of the spreadsheet to derive an object and an attribute for the query. The contextual answer generation manager can initiate the execution of the query using one or more data sources (e.g., the data sources 150-1 through 150-N of FIG. 1). For example, the contextual answer generation manager can execute the query using a web search engine, a website, and/or an external database. The response received in response to executing the query can be used by the contextual answer generation manager to populate the requested cell. In some implementations, the contextual answer generation manager 122 can automatically (e.g., without a user request pertaining to other cell(s)) generate additional queries in order to populate the other cells of the spreadsheet, including column headers (attributes) and row headers (objects). Further details with regard to the contextual answer generation manager are described herein below.

Figure 3:
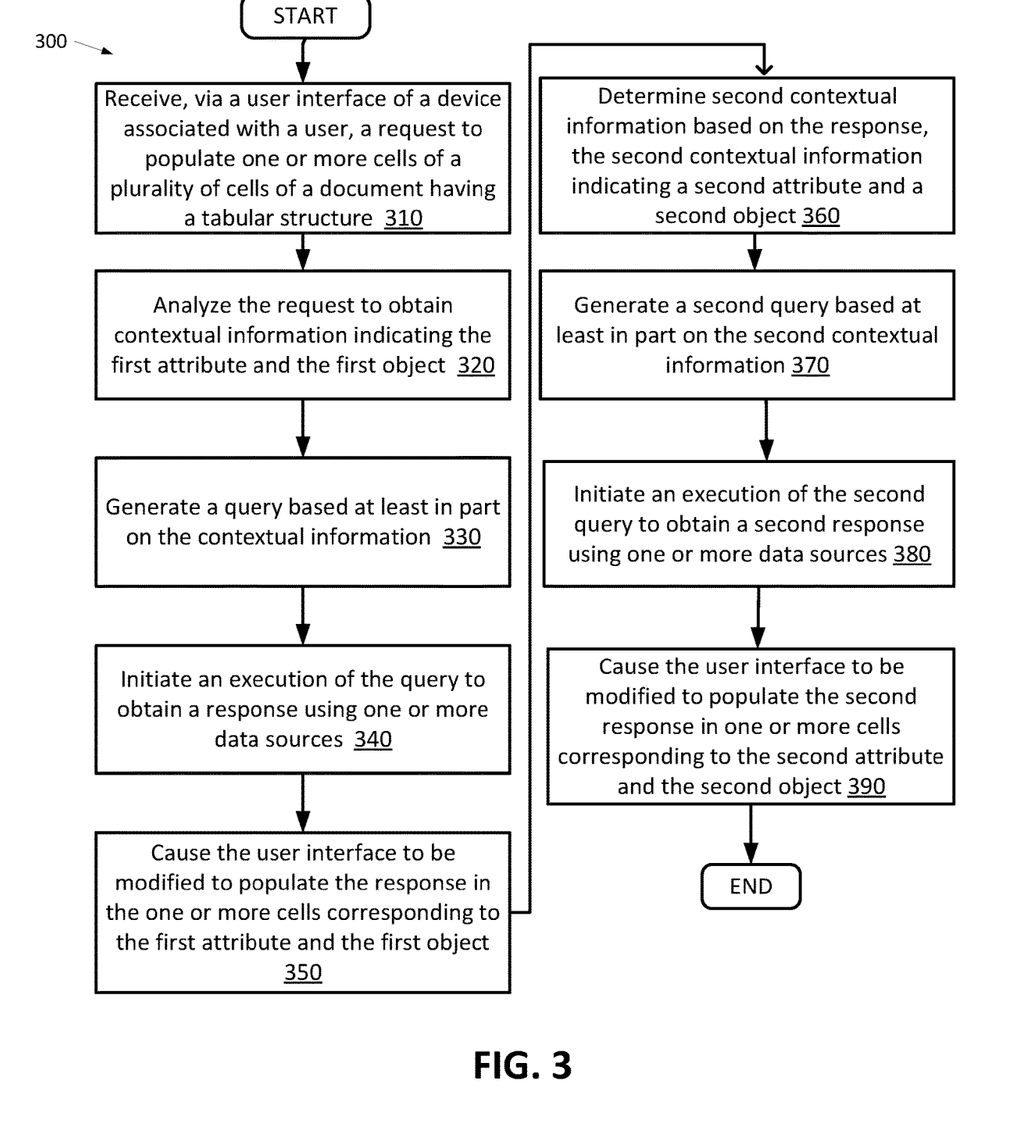
FIG. 3 depicts a flow diagram of a method for contextual answer generation in documents having a tabular structure, in accordance with implementations of the present disclosure.

FIG. 3 depicts a flow diagram of a method for contextual answer generation in documents having a tabular structure, in accordance with implementations of the present disclosure. Method 300 may be performed by processing logic that may include hardware (circuitry, dedicated logic, etc.), software (e.g., instructions run on a processing device), or a combination thereof. In one implementation, some or all the operations of method 300 may be performed by the contextual answer generation manager 122 of FIG. 1.

At block 310, the processing logic receives a request to populate one or more cells of a set of cells of a document. In some embodiments, the document can be the document 124 of FIG. 1. In some embodiments, the document can have a tabular structure (e.g., can include a number of intersecting rows and columns, such as in the example spreadsheet 200 illustrated in FIG. 2). In some embodiments, the processing logic can receive the request via a graphical user interface (e.g., the graphical user interface 112 of FIG. 1) via a device associated with a user (e.g., the client device 110 of FIG. 1). In some embodiments, the one or more cells of the document to be populated can correspond to an attribute. In particular, each cell of the document can have a corresponding column header. The column header can be the first cell within a column. For example, as illustrated in FIG. 2, the cell located at column 210B and row 220-2 can correspond to a column header (e.g., the first cell within column 210B—"Number of Seats"). In some embodiments, the one or more cells of the documents can also correspond to an object. In particular, each cell of the document can have a corresponding row header. The row header can be the first cell within a row. For example, as illustrated in FIG. 2, the cell located at column 210B and row 220-2 can correspond to a row header (e.g., the first cell within row 220-2—"BMW"). In some embodiments, the processing logic can receive the request from a user. In some embodiments, the request can include a set of selections. The request can include a selection of the one or more cells to be populated. The request can also include a selection of other cells of the document to use as contextual information for the populating the one or more cells. Receiving the request from the user can include the processing logic detecting a user clicking, highlighting and/or otherwise identifying (e.g., entering a question mark in) the one or more cells. In some embodiments, the user interface may also include one or more user interface elements such as one or more buttons, one or more check boxes or the like that allow a user to specify (e.g. via the one or more user interface elements such as one or more buttons, one or more check boxes or the like) whether the cells are identified for populating data or for using as contextual information. In some embodiments, receiving the request from the user can include receiving a voice query (e.g., received by a voice-controlled digital assistant). The processing logic can perform a suitable speech-to-text conversion technique to convert the voice query into a text form to use in a query. In some embodiments, the processing logic does not receive a request to populate the one or more cells. Responsive to the creation and/or opening of a spreadsheet, the processing logic can identify a number of blank cells in the document (e.g., identifying each cell of the spreadsheet with no text/strings inputted). The processing logic can automatically perform any of the operations at blocks 320 through 390 in response to identifying the blank cells in the document and/or respective column headers and/or respective row headers.

At block 320, the processing logic analyzes the request received. Analyzing the request can include identifying the one or more cells to be populated based on the selection of the one or more cells as included in the request. The processing logic can identify the corresponding attribute and object for each cell to be populated (e.g., the corresponding column header and the corresponding row header). For example, if the request is to populate the cell located at column 210B and row 220-2 of FIG. 2, the processing logic can identify the first cell within column 210B, which corresponds to the column header "Number of Seats." The processing logic can also identify the first cell within row 220-2, which corresponds to the row header "BMW". The processing logic can use the attribute and the object as contextual information to generate a query.

At block 330, the processing logic generates the query based on the contextual information identified at block 320 (e.g., the attribute and object identified for each cell to be populated). The processing logic can generate the query by extracting a string identifying the attribute and a string identifying the object from the corresponding column header and row header. The processing logic can input the extracted strings into a data access query (e.g., "BMW", "how many seats", etc.). In some embodiments, the data access query can be in a structured format (e.g., SQL format), semi-structured format, or free-text format.

At block 340, the processing logic initiates an execution of the query. Initiating execution of the query can include executing the query using one or more data sources that can be accessed via a network (e.g., Internet) or locally. In some embodiments, the query can be executed using one data source or using a combination of data sources. The data sources can include a web search engine, a website, an external database, and/or any other external sources of data. In some embodiments, a user can specify the one or more data sources to be used in executing the query. The user interface may allow a user to enter or select (e.g., in one or more cells of the spreadsheet or one or more fields outside the spreadsheet) the one or more data sources to be used in executing the query or provide voice input identifying the one or more data sources to be used in executing the query. The data sources can include, for example, documents stored by the user at the client device 110 of FIG. 1 or at a network-connected storage service, such as a cloud storage service. For example, the one or more data sources can be the data sources 150-1 through 150-N of FIG. 1. In another example, the one or more data sources can be or include documents that are currently open (e.g., displayed) in applications or windows on a user's system. The one or more data sources can include either or both of structured documents and unstructured documents. The query can produce one or more answers. Each answer may be associated with a relevancy score (which is determined based, for example, on information extraction techniques and/or natural language processing techniques such as named entity recognition or sentiment analysis). For example, using named entity recognition, the relevancy score associated with each answer can include a precision score, recall score, and/or F1 score for each answer. If more than one answer is produced, the processing logic can select the answer with the best (e.g., highest) relevancy score.

At block 350, the processing logic can cause the user interface to be modified to populate a response received from the execution of the query. Causing the user interface to be modified can include the processing logic populating the response in one of the one or more cells requested to be populated at block 310. In some embodiments, the processing logic can populate the response by inputting a string (e.g., text) representing the response into the cell. For example, in reference to FIG. 2, the processing logic can query a response to populate the cell corresponding to column 210B and row 220-2 ("Number of Seats," "BMW"). The processing logic can populate the response received for the query using the one or more data sources in the cell. For example, the processing logic can populate the string "5" into the cell corresponding to column 210B and row 220-2 as a response to the query ("Number of Seats," "BMW").

At block 360, the processing logic determines other contextual information for populating other cells of the document. The processing logic can determine the other contextual information based at least in part on the response populated in a cell at block 350.

In some embodiments, the processing logic can identify the corresponding attribute (e.g., the corresponding column header) for the response. The processing logic can also identify the corresponding object (e.g., the corresponding row header) for the response. The processing logic can identify an object of the document (e.g., another row header) that is different from the object corresponding to the response. Identifying the object that is different from the object corresponding to the response can include identifying another row header of the document (e.g., a first cell in a row of the document). The processing logic can use the corresponding attribute and the different object identified as the other contextual information to be used in generating another query. For example, as illustrated in FIG. 2, the processing logic can identify the corresponding attribute for a response (not pictured) populated in the cell corresponding to column 210-B and row 220-2. The corresponding attribute is "Number of Seats." The processing logic can identify the corresponding object for the response at that cell, e.g., "BMW." The processing logic can identify another object of the spreadsheet 200 that is different from the object "BMW." For example, the processing logic can identify "Mercedes" which is the row header for row 220-3. The processing logic can use the attribute "Number of Seats" and "Mercedes" to generate another query to be used in populating other cells (e.g., responses) of the document, e.g., the cell corresponding to column 210B and row 220-3.

In some embodiments, the processing logic can use the attribute "Number of Seats" and object "Mercedes" to generate another query to add other column headers and/or row headers to the document (e.g., new attributes and/or objects to be added to the document). For example, the processing logic can use "Number of Seats" and "Mercedes" to generate another query to populate the column cell 210E (which does not include a header). As discussed herein below, the column cell 210E can be populated with a column header related to the content of the spreadsheet, such as another relevant attribute like "Image of Car." In another example, the processing logic can use "Number of Seats" and "Mercedes" to generate another query to populate the row cell 220-5 (which does not include a header). As discussed herein below, the row cell 220-5 can be populated with a header related to the content of the spreadsheet, such as another relevant object like "Tesla." For example, the other query may identify the attribute "Number of Seats" and request information for an object similar to (e.g., of the same object type as) the one or more of the existing objects 220-2, 220-3, 220-4. Upon obtaining the response, the processing logic can identify an object not previously represented by the row headers and similar to (e.g., of the same object type as) the one or more of the existing objects 220-2, 220-3, 220-4, and add that object as an additional row header 220-5. The processing logic can then generate yet another query using the new object and the existing attributes to obtain information for the attributes and populate the respective cells corresponding to the new object with the obtained information.

In some embodiments, the processing logic can identify the corresponding attribute (e.g., the corresponding column header) for the response. The processing logic can also identify the corresponding object (e.g., the corresponding row header) for the response. The processing logic can identify an attribute of the document (e.g., another column header) that is different from the attribute corresponding to the response. The processing logic can use the different attribute and the corresponding object identified as the other contextual information for generating another query. For example, as illustrated in FIG. 2, the processing logic can identify the corresponding attribute for a response (not pictured) populated in the cell corresponding to column 210-B and 220-2. The corresponding attribute is "Number of Seats." The processing logic can identify a different attribute than "Number of Seats." For example, the processing logic can identify "Horse Power," which is the column header 210C. The processing logic can also identify the corresponding object for the response, e.g., "BMW." In some embodiments, the processing logic can use the attribute "Horse Power" and object "BMW" to generate another query to be used in populating other cells (e.g., responses) of the document, e.g., the cell corresponding to column 210C and row 220-2.

In some embodiments, the processing logic can use the attribute "Horse Power" and object "BMW" to generate another query to populate other column headers and/or row headers of the document (e.g., other attributes and/or objects of the document). For example, the processing logic can use "Horse Power" and "BMW" to generate another query to populate the column cell 210E. As discussed herein below, the column cell 210E can be populated with a column header related to the spreadsheet, such as another relevant attribute like "Image of Car." For example, the other query may identify the object "BMW" and request information for an attribute relevant to the object "BMW" or its object type (e.g., object type "car") and other than the one or more of the existing attributes 210B, 210C and 210D. Upon obtaining the response, the processing logic can identify an attribute not previously represented by the column headers of the existing attributes 210B, 210C and 210D and relevant to the object "BMW" or its object type (e.g., object type "car"), and add that attribute as additional column header 210E. The processing logic can then generate another query using the new attribute and the existing objects to obtain information for the objects and populate the respective cells with the obtained information.

In some embodiments, when creating the query to obtain a new object or a new attribute, the processing logic uses additional information (e.g., the title of the spreadsheet, description or any other information provided by the user to indicate the purpose of the spreadsheet) to determine what additional objects and/or attributes should be added to the spreadsheet to help the user with their task. For example, if the user creates a spreadsheet for buying a car with rows having different car brands and columns having different attributes for the car brands, the processing logic can determine, based on contextual information, which additional car brands can be of interest to the user (e.g., have similar price, number of seats, etc.) and which additional attributes can be important to the user when making a decision on what car to select for purchase. As discussed above, the contextual information can include, for example, one or more of the existing objects, one or more of the existing attributes, any response previously generated, and/or any additional information in the spreadsheet, and can be provided as part of the query. The query can be, for example, a structured query, a semi-structured query, or free text query.

As discussed above, the processing logic generates another query at block 370 based at least in part on the other contextual information determined at block 360.

At block 380, the processing logic initiates execution of the other query. Initiating execution of the other query can include executing the query using one or more data sources. For example, the one or more data sources can be the data sources 150-1 through 150-N of FIG. 1. In some embodiments, the query can be executed using one data source or using a combination of data sources. The data sources can include a web search engine, a website, an external database, and/or any other external sources of data. In some embodiments, a user can specify the one or more data sources to be used in executing the query.

At block 390, the processing logic can cause the user interface to be modified to populate another response received from the execution of the other query. The processing logic can populate the other response into one of the cells of the document pertaining to the corresponding column header and row header. In some embodiments, the processing logic can populate the other response by inputting a string (e.g., text) representing the other response into the cell.

Figure 4:
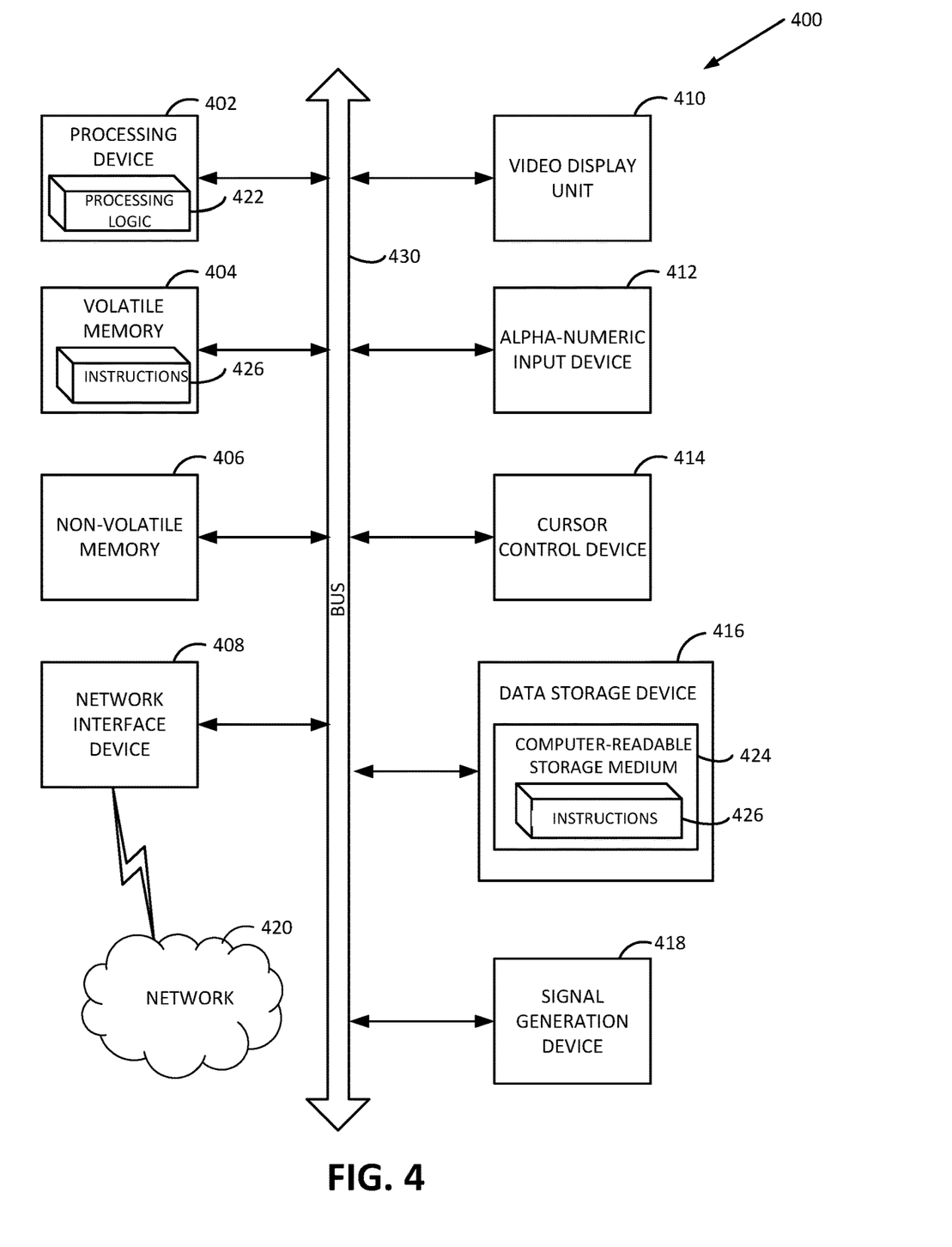
FIG. 4 is a block diagram illustrating an exemplary computer system, in accordance with implementations of the present disclosure.

FIG. 4 is a block diagram illustrating an exemplary computer system, in accordance with implementations of the present disclosure. The computer system 400 can be the document platform 120 or the client device 110 in FIG. 1. The machine can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processing device (processor) 402, a main memory 404 (e.g., read-only memory (ROM), flash memory, dynamic random access memory (DRAM) such as synchronous DRAM (SDRAM), double data rate (DDR SDRAM), or DRAM (RDRAM), etc.), a static memory 406 (e.g., flash memory, static random access memory (SRAM), etc.), and a data storage device 418, which communicate with each other via a bus 440.

Processor (processing device) 402 represents one or more general-purpose processing devices such as a microprocessor, central processing unit, or the like. More particularly, the processor 402 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 can also be one or more special-purpose processing devices such as an application specific integrated circuit (ASIC), a field programmable gate array (FPGA), a digital signal processor (DSP), network processor, or the like. The processor 402 is configured to execute instructions 405 (e.g., for predicting channel lineup viewership) for performing the operations discussed herein.

The computer system 400 can further include a network interface device 408. The computer system 400 also can include a video display unit 410 (e.g., a liquid crystal display (LCD) or a cathode ray tube (CRT)), an input device 412 (e.g., a keyboard, and alphanumeric keyboard, a motion sensing input device, touch screen), a cursor control device 414 (e.g., a mouse), and a signal generation device 420 (e.g., a speaker).

The data storage device 418 can include a non-transitory machine-readable storage medium 424 (also computer-readable storage medium) on which is stored one or more sets of instructions 405 (e.g., for obtaining optimized encoder parameter settings) embodying any one or more of the methodologies or functions described herein. The instructions can also reside, completely or at least partially, within the main memory 404 and/or within the processor 402 during execution thereof by the computer system 400, the main memory 404 and the processor 402 also constituting machine-readable storage media. The instructions can further be transmitted or received over a network 430 via the network interface device 408.

In one implementation, the instructions 405 include instructions for designating a verbal statement as a polling question. While the computer-readable storage medium 424 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user may opt-in or opt-out of participating in such data collection activities. In one implementation, the collected data is anonymized prior to performing any analysis to obtain any statistical patterns so that the identity of the user cannot be determined from the collected data.

What is claimed is:

1. A method comprising:
    receiving, via a user interface of a client device, a request to populate one or more cells of a plurality of cells of a document having a tabular structure, wherein the one or more cells correspond to a first attribute pertaining to a first column header and a first object pertaining to a first row header;
    analyzing the request and one or more additional cells corresponding to one or more additional attributes pertaining to additional column headers of the document and one or more additional objects pertaining to additional row headers of the document to obtain contextual information for the request;
    generating a query based at least in part on the contextual information;
    initiating an execution of the query to obtain a response using one or more data sources; and
    causing the user interface to be modified to populate the response in the one or more cells corresponding to the first attribute and the first object.

2. The method of claim 1, wherein the request comprises a first selection and a second selection, wherein the first selection indicates the one or more cells to be populated, and wherein the second selection indicates at least a portion of the contextual information.

3. The method of claim 1, wherein the one or more data sources comprise at least one of a web search engine, a website, or an external database.

4. The method of claim 1, wherein the first object is the same as a second object, and wherein the first object and the second object each pertain to the first row header.

5. The method of claim 1, wherein the first object is different from a second object, and wherein the first object and the second object each pertain to a different row.

6. The method of claim 1, wherein the first attribute is the same as a second attribute, and wherein the first attribute and the second attribute each pertain to the first column header.

7. The method of claim 1, wherein the first attribute is different from a second attribute, and wherein the first attribute and the second attribute each pertain to a different column.

8. The method of claim 1, wherein receiving the request comprises detecting a cursor highlighting the one or more cells of the plurality of cells.

9. The method of claim 1, wherein the user interface of the device associated with the user comprises an area presenting the plurality of cells of the document arranged in intersecting rows and columns.

10. A system comprising:
    a memory device; and
    a processing device coupled to the memory device, the processing device to perform operations comprising:
    receiving, via a user interface of a client device, a request to populate one or more cells of a plurality of cells of a document having a tabular structure, wherein the one or more cells correspond to a first attribute pertaining to a first column header and a first object pertaining to a first row header;
    analyzing the request and one or more additional cells corresponding to one or more additional attributes pertaining to additional column headers of the document and one or more additional objects pertaining to additional row headers of the document to obtain contextual information for the request;
    generating a query based at least in part on the contextual information;
    initiating an execution of the query to obtain a response using one or more data sources; and
    causing the user interface to be modified to populate the response in the one or more cells corresponding to the first attribute and the first object.

11. The system of claim 10, wherein the request comprises a first selection and a second selection, wherein the first selection indicates the one or more cells to be populated, and wherein the second selection indicates at least a portion of the contextual information.

12. The system of claim 10, wherein the one or more data sources comprise at least one of a web search engine, a website, or an external database.

13. The system of claim 10, wherein the first object is the same as a second object, and wherein the first object and the second object each pertain to the first row header.

14. The system of claim 10, wherein the first object is different from a second object, and wherein the first object and the second object each pertain to a different row.

15. The system of claim 10, wherein the first attribute is the same as a second attribute, and wherein the first attribute and the second attribute each pertain to the first column header.

16. The system of claim 10, wherein receiving the request comprises detecting a cursor highlighting the one or more cells of the plurality of cells.

17. A non-transitory computer-readable storage medium including program instructions executable by one or more processors that, when executed, cause the one or more processors to perform operations, the operations comprising:
receiving, via a user interface of a client device, a request to populate one or more cells of a plurality of cells of a document having a tabular structure, wherein the one or more cells correspond to a first attribute pertaining to a first column header and a first object pertaining to a first row header;
analyzing the request and one or more additional cells corresponding to one or more additional attributes pertaining to additional column headers of the document and one or more additional objects pertaining to additional row headers of the document to obtain contextual information for the request;
generating a query based at least in part on the contextual information;
initiating an execution of the query to obtain a response using one or more data sources; and
causing the user interface to be modified to populate the response in the one or more cells corresponding to the first attribute and the first object.

18. The non-transitory computer-readable storage medium of claim 17, wherein the request comprises a first selection and a second selection, wherein the first selection indicates the one or more cells to be populated, and wherein the second selection indicates at least a portion of the contextual information.

19. The non-transitory computer-readable storage medium of claim 17, wherein the one or more data sources comprise at least one of a web search engine, a website, or an external database.

20. The non-transitory computer-readable storage medium of claim 17, wherein the first object is different from a second object, wherein the first object and the second object each pertain to a different row, wherein the first attribute is the same as a second attribute, and wherein the first attribute and the second attribute each pertain to the first column header.

\* \* \* \* \*